United States Patent Office 3,313,273
Patented Apr. 11, 1967

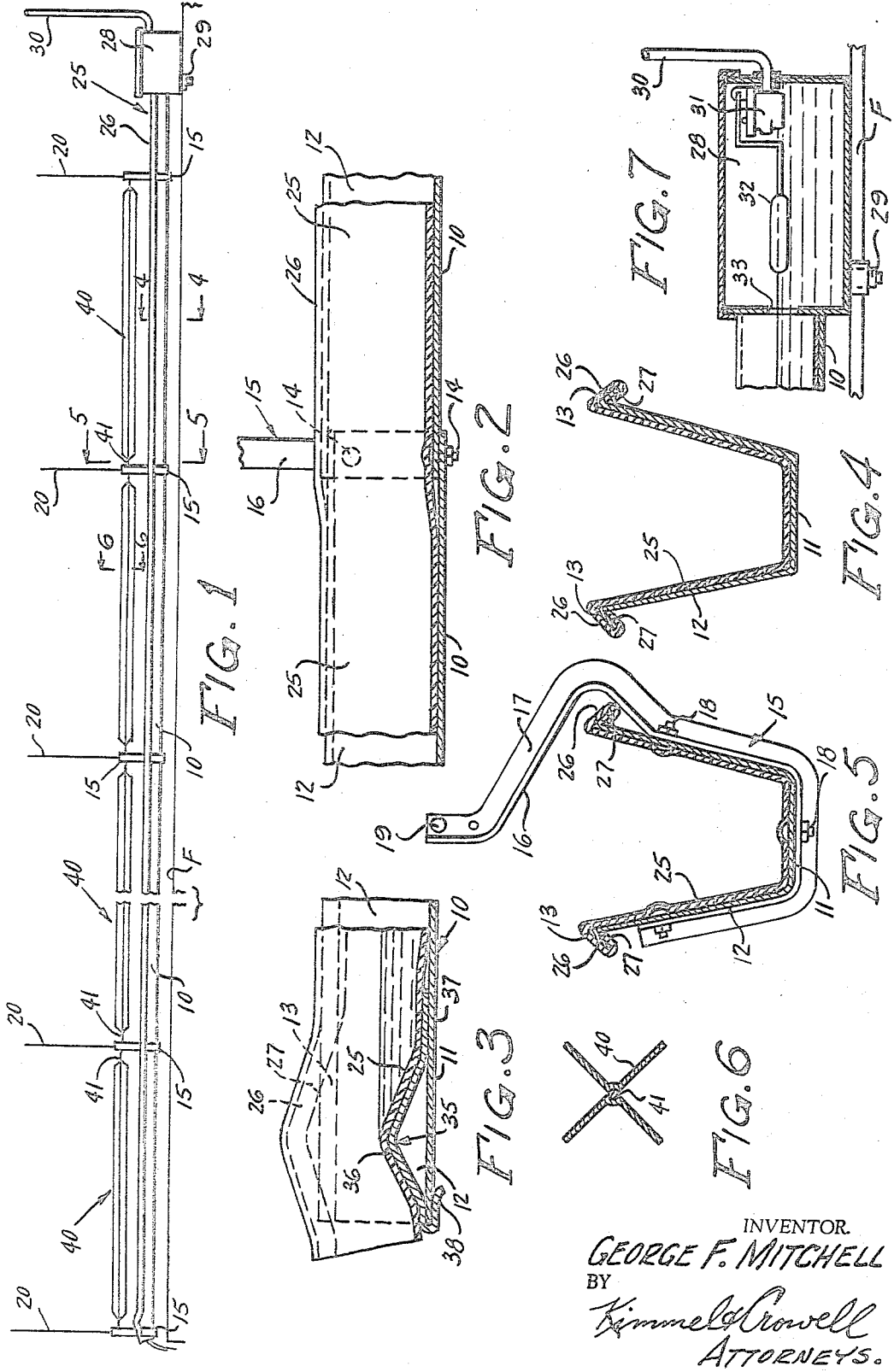

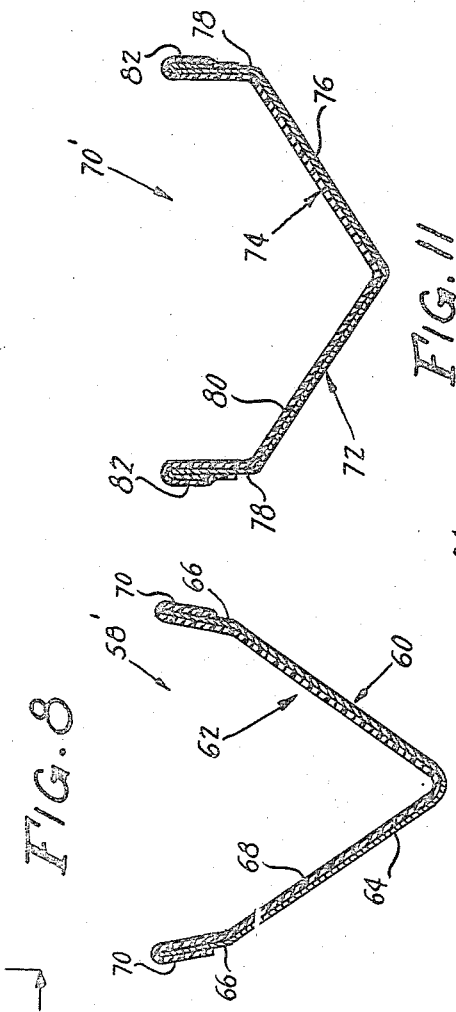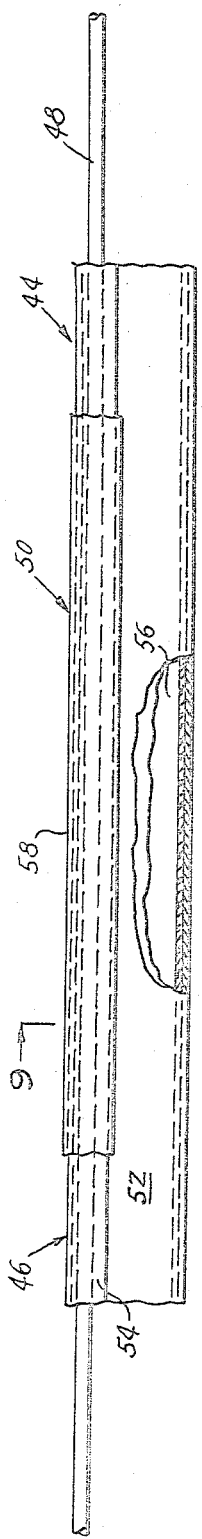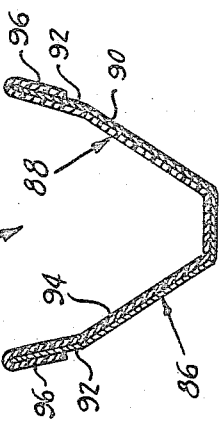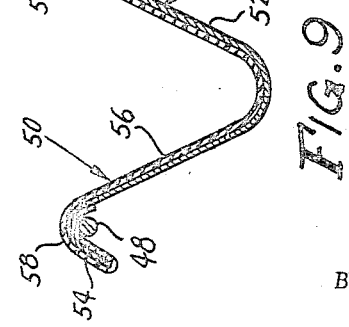

3,313,273
POULTRY WATERING TROUGH AND LINER
George F. Mitchell, Sidney, Ohio, assignor to Everyday Manufacturing Company, Sidney, Ohio, a corporation of Ohio
Filed Feb. 21, 1966, Ser. No. 529,102
5 Claims. (Cl. 119—72)

This application is a continuation-in-part of Ser. No. 383,341, filed July 17, 1964, now abandoned.

This invention relates to a poultry watering trough, and more particularly to a trough which may be positioned in a chicken house longitudinally extending along a row of roosts, or cages, whereby the poultry may obtain fresh water at all times.

As conducive to an understanding of the instant invention, it should be pointed out at this time that poultry watering troughs were initially made as an elongate metallic structure having a central water retaining section. Bcause of difficulties in maintaining a sanitary trough, and because of the frustrations in attempting to clean a metallic trough, the prior art has attempted to manufacture a plastic trough, as exemplified by United States Patent 2,828,717, or a plastic lined metallic trough, exemplified by United States Patent 3,150,638. The attempts by the prior art to produce a sanitary, easily cleaned trough have not been successful because of the failure to comprehend the necessity of covering the entire water retaining interior and top edges of the metallic trough. This has resulted in the exposure of metal parts, which have proved inordinately difficult to clean, to the contaminating elements in the water or feed placed in the trough and to the detritus commonly existing in poultry houses.

It is accordingly an object of the instant invention to provide a trough for watering and feeding poultry in which an elongate plastic liner is utilized to cover the entire water retaining interior and top edges of the trough.

Another object of the instant invention is to provide a poultry watering and feeding trough in which a plastic liner is utilized to cover the entire water retaining interior thereof and to overlap the extremities of the trough.

Still another object of the instant invention is to provide a device of the character described comprising an external supporting trough which is comprised of connected metallic sections, and suitable means for supporting the trough at a desired height, in combination with an inner continuous plastic liner, thus obviating the necessity of securing the metallic sections of the outer trough in fluid tight relation.

A further object of the instant invention is to provide a poultry watering and feeding trough of the character described wherein the liner is comprised of extruded plastic of any desired length, the material being flexible so that the liner may be rolled for shipment or storage.

A still further object of the instant invention is to provide means in association with such a liner and series of supporting troughs whereby the liner may be readily secured in the supporting trough without the use of bolts or the like.

A further object of the instant invention is to provide a watering and feeding trough which may be simply and inexpensively manufactured and assembled, which is sturdy and durable in construction, reliable and efficient in operation, and which may be formed in any desired length.

Still other objects and advantages of the instant invention reside in the combinations of elements, arrangements of parts and features of construction and utilization, all of which will be more fully pointed out hereinafter and disclosed in the accompanying drawing wherein there are shown prefered embodiments of this inventive concept.

In the drawing:

FIGURE 1 is a side elevational view of a continuous sectional watering trough constructed in accordance with the principles of the instant invention;

FIGURE 2 is an enlarged longitudinal cross-sectional view taken through the trough, showing the connection of sections of the supporting trough;

FIGURE 3 is a longitudinal sectional view taken through the end of the trough, showing means for providing an end closure to retain a selected water level within the trough;

FIGURE 4 is an enlarged transverse cross-sectional view of the trough of the instant invention taken substantially along line 4—4 of FIGURE 1 as seen in the direction indicated by the arrows;

FIGURE 5 is an enlarged transverse cross-sectional view of the poultry watering and feeding trough of the instant invention taken substantially along line 5—5 of FIGURE 1 as viewed in the direction of the arrows;

FIGURE 6 is an enlarged transverse cross-sectional view of an anti-roosting device which may be used with the trough of the instant invention taken substantially along line 6—6 of FIGURE 1 as viewed in the direction indicated by the arrows;

FIGURE 7 is a longitudinal cross-sectional view taken through the water supply means shown in elevation in FIGURE 1;

FIGURE 8 is a side elevational view, partly in section, of another form of poultry watering and feeding trough of the instant invention;

FIGURE 9 is an enlarged transverse cross-sectional view of the poultry watering and feeding trough of FIGURE 8, taken substantially along line 9—9 thereof as viewed in the direction indicated by the arrows;

FIGURE 10 is an enlarged transverse cross-sectional view of another form of poultry watering trough of the instant invention;

FIGURE 11 is an enlarged cross-sectional view of still another embodiment of poultry watering and feeding trough of the instant invention; and FIGURE 12 is an enlarged cross sectional view of still another form of poultry watering trough of the instant invention.

Referring now to the drawings in detail, wherein like reference characters designate like elements throughout the several views thereof, and more particularly to FIGURES 1 to 5 inclusive, the watering trough of the instant invention is comprised of a series of elongated metal supporting trough sections 10 which, as best shown in FIGURES 4 and 5, have a water retaining cross-sectional configuration which is illustrated as a generally U-shaped structure having a bottom 11, outwardly diverging side walls 12 and downwardly inclined outwardly extending flanges 13 along their top edges. The metal sections are secured in related assembly as by bolts and nuts 14, and may be of any desired length, although lengths of 8 to 10 feet have been found convenient for handling. The bolt connections need not be fluid tight for reasons which will become apparent hereinafter.

The supporting trough sections may be suspended from the ceiling, as by hangers indicated generally at 15, which are generally T-shaped in cross-section including a cross flange 16 and a stem flange 17, and are so arranged as to encircle the bottom of the supporting troughs, being secured thereto by bolts and nuts 18. The upper portion of each hanger extends inwardly over the top of the trough and includes openings 19, by means of which the entire assembly may be suspended from wires 20 which are secured to the ceiling of the poultry house.

The trough is provided with a continuous inner liner 25, which is preferably comprised of a continuous extruded plastic, such as polyvinyl chloride, polystyrene, polyethylene, or any other suitable flexible material, so that the liner may be made of a continuous length of 100 feet or more if desired, and rolled for shipment or storage. The term "plastic" is used in a non-technical sense to include all materials having properties similar to that of the enumerated examples. Since the plastic liner, per se, is completely waterproof, it is unnecessary to connect the supporting troughs in fluid tight relation. Liner 25 is formed of a cross-section corresponding to the interior dimensions of the supporting troughs, and includes flanges 26 which extend along the top edges of the sides thereof and which have reverted end portions 27 which snap around flanges 13 to hold the parts in related assembly. It will be apparent that the entire interior water retaining configuration of trough sections 10 are covered by liner 25 to prevent gross contamination of the hard to clean portions of trough sections 10. It will be quite apparent that any desired lengths of trough sections 10 may be manufactured for use with the instant invention.

Referring now to FIGURES 1 and 7, a supporting floor F at one end of the water trough assembly carries a tank 28 which is provided with a drain 29 and an inlet pipe or hose 30. Pipe 30 feeds into a valve chamber 31 which contains a float valve actuated to open and close by means of a float 32 which retains the water at a desired level in tank 28 and its associated trough, the tank communicating therewith through on opening 33. Fluid tight connections of any desired form may be provided between plastic liner 25 and tank 28.

Means are provided at the other end of the trough for retaining the water level at a desired height, and may constitute any desired means for closing the normally open end of the trough. However, a particularly advantageous means of maintaining this water level is provided by the use of a wedge-shaped member generally indicated at 35 which includes a protruding portion 36 and a flat portion 37, which is inserted between bottom 11 of trough 10 and the bottom of liner 25, as best shown in FIGURE 3. This elevates the bottom of liner 25 and forms a dam across the end of the trough, so that the water level is maintained at a desired height, and at the same time provides a suitable overflow at the end of the trough to prevent the trough from becoming too full and flowing over the sides. Wedge 35 is held in position by means of a resilient clip portion 38 which fastens over the end of supporting trough 10.

Any desired anti-roosting means, generally indicated at 40, may be provided over the trough to prevent contamination of the water therein. In the embodiment illustrated, anti-roosting device 40 takes the form of a reel as shown in FIGURE 6, which is rotatably mounted on pins 41 at its ends, with the pins suitably secured to opposite sides of the upper portions of hangers 15. Obviously, any other type of anti-roosting device may be employed, and in the case of cage birds where the trough runs between the cages, no anti-roosting means are necessary.

Referring now to FIGURES 8 and 9, another form of watering and feeding trough is shown generally at 44 and has as its major components a substantially V-shaped trough section shown generally at 46 supported by a pair of substantially parallel rods 48 with a continuous plastic liner shown generally at 50 which covers the water retaining interior of trough section 46 as well as the upper edges thereof.

Trough section 46 includes a central segment 52 having a water retaining cross-sectional configuration and a pair of outwardly extending flanges 54 spaced from central segment 52 in order to receive supporting rods 48. Trough flanges 54 are arcuately outwardly and downwardly extending as contrasted to the rather sharply angled nature of trough flange 13 of the embodiment of FIGURE 5.

Plastic liner 50 includes a central section 56 corresponding generally to the configuration of central segment 52 of trough section 46 and a pair of outwardly extending flanges 58 which extend over the uppermost portions of trough section 46 and overlaps or sandwiches the outermost extremities of trough flanges 54 to prevent gross contamination of the hard to clean areas of trough section 46. As may be seen in FIGURE 9, the outer end of liner flanges 58 is positioned such that supporting rods 48 are spaced from trough section 46 resulting in electrical insulation therebetween to avoid unnecessary abrasion between rods 48 and trough section 46 when assembling and disassembling feeding and watering trough 44.

Referring now to FIGURE 10, another form of watering and feeding trough is shown generaly at 58′ having a substantially rigid trough section designated generally at 60 of generally V-shaped configuration and a plastic liner denominated generally at 62 covering the water retaining interior of trough section 60 and the uppermost extremities thereof. Trough section 60 includes a central segment 64 of water retaining trough section and a pair of substantially straight upwardly extending side walls 66 forming the extremities of trough section 60. Plastic liner 62 includes a central section 68 generally conforming to the configuration of water retaining segment 64 and a pair of flanges 70 overlapping the upper extremities of side walls 66 to completely cover trough section 60 to simplify cleaning thereof.

Referring now to FIGURE 11, another form of the watering and feeding trough of the instant invention is shown generally at 70′ and includes a substantially rigid trough section designated generally at 72 for retaining a quantity of feed or water therein and a substantially continuous plastic liner designated generally at 74 for covering the upper exposed portions of trough section 72. Trough section 72 is generally of V-shaped configuration and includes a central segment 76 of water retaining configuration and a pair of substantially vertical side walls 78 which are reverted to form a smooth upper extremity. Plastic liner 74 includes a central section 80 generally conforming to the configuration of central segment 76 and a pair of outwardly extending flanges 82 overlapping the extremities of side walls 78 to completely cover trough section 72 to simplify cleaning thereof.

Referring now to FIGURE 12, still another embodiment of a watering and feeding trough of the instant invention is shown generally at 84 having a substantially rigid trough section denominated generally at 86 and a continuous pastic liner shown generally at 88. Trough section 86 includes a central segment 90 of water retaining configuration and a pair of upwardly inclined side walls 92 forming the extremities of trough section 86. Plastic liner 88 includes a central section 94 generally conforming to the water retaining configuration of trough section 86 and a pair of substantially parallel outwardly disposed reverted flanges 96 overlapping the uppermost extremities of side walls 92 to completely cover trough section 86 to simplify cleaning thereof. From the numerous embodiments shown, it should be readily apparent that any suitable cross-sectional shape of the trough section may be utilized with the plastic liner of the instant invention.

From the foregoing, it will now be seen that there is herein provided an improved watering and feeding device particularly adapted for poultry, which accomplishes all of the objects of this invention and others, including many advantages of great practical utility and commercial importance.

It will also be seen that while the herein described arrangement of longitudinally connected supporting troughs with an internal continuous extruded plastic liner is particularly adapted to a watering trough for poultry, it may be equally well applied to other types of troughs for containing fluids and comminuted material.

As many embodiments may be made of the instant inventive concept, and since many modifications may be made in the embodiments hereinbefore shown and described, it is to be understood that all matter herein is to be interpreted merely as illustrative and not in a limiting sense.

I claim:

1. A trough, particularly adapted for watering poultry, comprised of a series of elongated supporting troughs of liquid retaining cross-section longitudinally aligned and connected together, support means for said troughs, a removable continuous plastic waterproof liner having a preformed cross-sectional shape conforming to the interior contour of the trough and extending the full length of said series, said liner being removably secured to the trough with the preformed cross-sectional shape generally conforming to the liquid retaining configuration of the trough, said supporting trough being provided with outwardly extending flanges along its top side edges, and said liner being provided with corresponding flexible flanges having reverted outer edge portions snappingly engaging around said first mentioned flanges completely covering all exposed interior parts of said supporting troughs to simplify cleaning thereof.

2. The structure of claim 1 wherein said plastic liner is flexible and may be rolled for shipment.

3. The structure of claim 1 wherein bolts are used to connect said supporting troughs.

4. The structure of claim 1 wherein a longitudinally extending anti-roosting device is supported above said liner by said support means.

5. The structure of claim 1 wherein said support means comprises hangers secured to said supporting troughs and adapted to be suspended from a ceiling.

References Cited by the Examiner
UNITED STATES PATENTS

| | | | |
|---|---|---|---|
| 2,452,237 | 10/1948 | Hoburg et al. | 119—72 |
| 2,719,509 | 10/1955 | Kitson | 119—74 |
| 2,918,194 | 12/1959 | Quigley et al. | 220—64 |
| 2,956,915 | 10/1960 | Korn et al. | 220—64 |
| 3,015,308 | 1/1962 | Beresford | 119—61 |
| 3,122,131 | 2/1964 | Warren | 119—72 |

SAMUEL KOREN, *Primary Examiner.*

HUGH R. CHAMBLEE, *Examiner.*